Patented Apr. 1, 1941

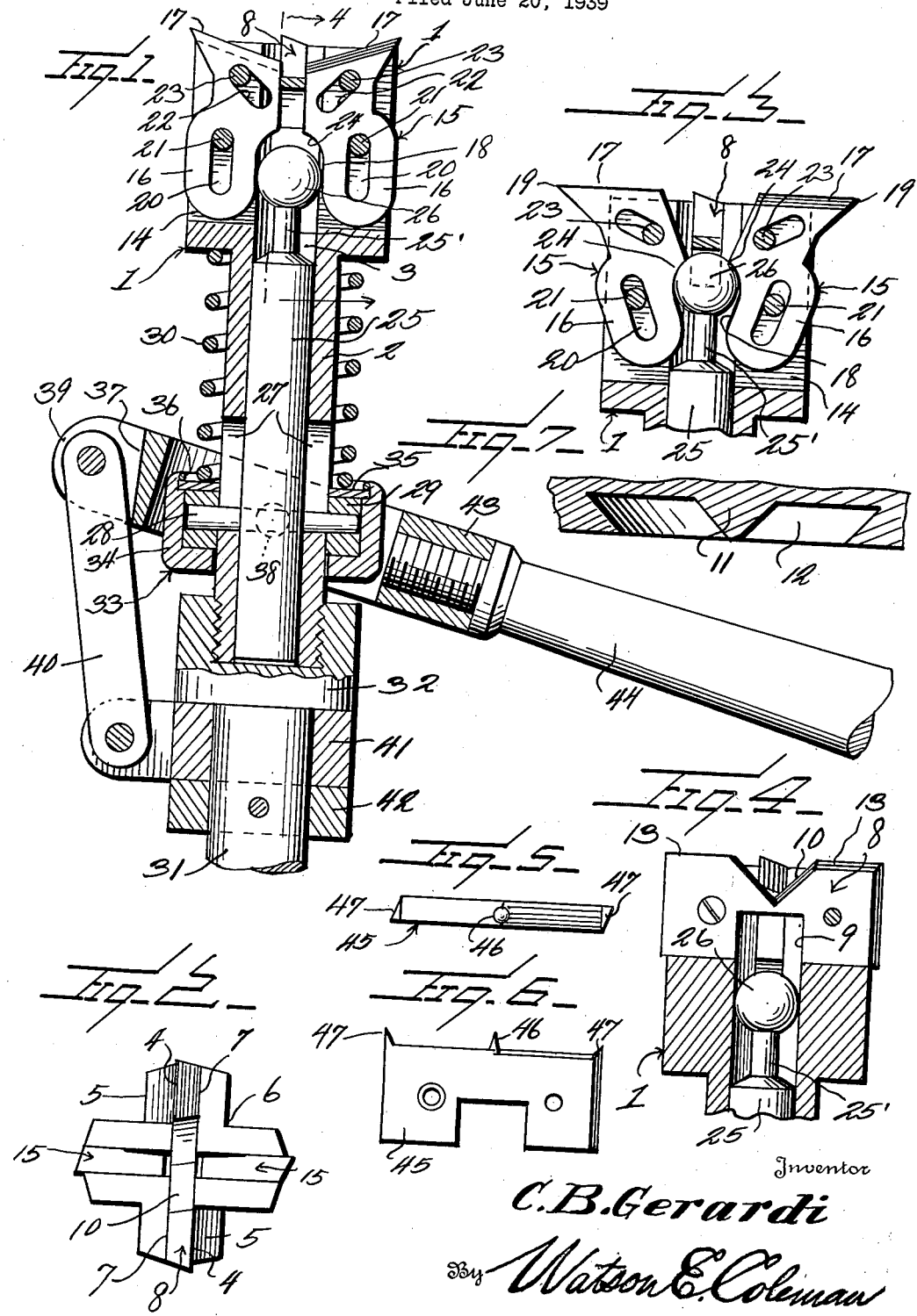

2,236,944

UNITED STATES PATENT OFFICE 2,236,944

DRILL BIT

Charles B. Gerardi, Trinidad, Colo.

Application June 20, 1939, Serial No. 280,179

10 Claims. (Cl. 255—74)

This invention relates to the class of tools and pertains particularly to improvements in drill bits.

The primary object of the present invention is to provide a new and novel type of drill bit by means of which the performance of a number of drilling operations is made possible, one of the principal operations which the present bit is designed to perform being the drilling or boring of inverted counterbore holes by which is meant holes having a bore of gradually increasing taper from the outer to the inner end whereby the inner end of the bore may be made cone-like to receive a dowel inserted with a metal or hardwood wedge in its end by which such end may be spread when the dowel is driven in.

Another object is to provide a drill bit capable of forming bores having enlarged cone-like inner ends and having a solid center cone body for spreading a dowel pin driven into the bore so that the spread end of the pin will be firmly locked in the enlarged inner end of the bore.

Still another object is to provide an improved drill bit by means of which it is possible to drill relatively long or deep holes and to form an abrupt increase in the diameter of any part of the hole or form a gradual taper of increasing diameter from any part of the hole toward or to the inner end thereof.

Another object is to provide in a drill bit of the character described, a novel mounting means for oscillatable cutters forming a part of the bit head whereby such cutters may be projected or extended as desired to not only cut out the side walls of a bore but to cooperate, when fully extended, with fixed cutters for the cutting of the inner end of the bore.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view in longitudinal section through the bit embodying the present invention, showing the shiftable cutters retracted.

Fig. 2 is a view looking toward the end or working face of the bit.

Fig. 3 illustrates the manner in which the oscillatable cutters are projected.

Fig. 4 is a sectional view taken substantially on the line 4—4 of Fig. 1, showing one form of fixed cutter used in the bit.

Fig. 5 is an edge view of another form of fixed cutter.

Fig. 6 is a view in elevation of the cutter shown in Fig. 5.

Fig. 7 illustrates the formation of an end of a bore by the cutter assembly shown in Fig. 3.

Referring now more particularly to the drawing, the numeral 1 generally designates the drill head of the present tool which has formed integrally therewith the stem 2. The stem 2 is of tubular form as shown, and the head 1 has a central passage or bore 3 therethrough which communicates with the tubular end of the stem and when opens through the working end of the head.

At diametrically opposite sides of the head there are formed the longitudinal channels 4, one wall of each channel being longitudinally curved at its inner end, as indicated at 5, for the purpose of guiding cuttings or chips out of the bore formed by the drill and disposed between the channels 4 and extending longitudinally of the head are corresponding channels 6 which are straight throughout.

Extending diametrically across the working end of the head 1 is a cutter slot 7 which passes through the radial center of the passage 3 and this slot opens at each end through the face of each of the channels 4 which has its inner end curved.

The slot 7 is designed to receive a double bladed cutter which is indicated generally by the numeral 8 and which consists of a flat plate which when placed in the slot 7, extends diametrically across the head and which has at one edge a recess 9 of a width equal to the diameter of the passage 3 and directed into the passage. Its opposite edge is cut out as indicated at 10, and this cut out portion may be of any desired form, the form illustrated in connection with the blade which is particularly identified by the numeral 8, being cone-like so that when the blade is performing a cutting operation, the inner end of the bore will be formed with an upstanding cone as illustrated in Fig. 7 at 11, the bore being indicated by the numeral 12 and having a larger diameter at its inner end than at its outer end as a result of the projection of the shiftable blades of the bit which will be hereinafter described.

As a result of the formation of the cutter 8 with the V-like central portion 10, there are provided two blades or cutting edges 13 which are disposed upon opposite sides of the portion 10.

Extending diametrically through the head and opening through the working end thereof is a second cutter slot 14. This slot is perpendicular to the slot 7 and is of materially greater depth than the slot 7, by which is meant that it extends farther in a longitudinal direction in the head than does the slot 7 which is relatively shallow.

In each end of the deep blade slot 14 there is disposed an oscillatable or laterally swingable cutter 15 which is in the form of a flat elongated plate having an inner end or tail portion 16 and an outer blade end 17, the cutter being disposed to extend longitudinally of the head in the slot 14 and being in spaced relation with the opposite cutter 15, as shown. The opposing inner edges of the cutters 15 are recessed or cut out, as indicated at 18, through a portion of their lengths and the distance between the opposing edges of the recessed portions is equal to the diameter of the passage 3 through the cutter head. The cutting edges or blades 17 of the oscillatable cutters 8 extend obliquely across the cutter so that when the cutters are in retracted position in the cutter head, the major portion of the cutting edge or blade of each cutter will be below or inwardly of the plane of the end of the head, only the point or outer end part 19 of each blade being exposed or projecting beyond the end of the head, and these points are so disposed that they will be exactly the same distance from the radial center of of the head as the outer ends or points of the blades 13 of the cutter 8.

Each of the cutters 15 has a short longitudinally extending slot 20 therethrough in the inner end or tail portion thereof through which extends a guide pin 21. Adjacent the outer end portion of each cutter 15 is an obliquely directed slot 22 through which extends a guide pin 23. The pins 21 and 23 are disposed in the outer ends of their respective slots when the cutters are in retracted position or when the cutters extend longitudinally of the head.

As shown, the edges of the recesses 18 of the cutters 15 curve toward the radial center of the cutter head at their outer ends thus forming camming edges or faces 24 which are disposed substantially midway between the ends of the head.

Disposed within the hollow stem 2 is a blade ejector pin 25, the forward or outer end of which is connected by a reduced longitudinally extending neck portion 25', with a ball head 26 which normally positions between the opposing edge recesses 18 of the shiftable cutters 15. This head 26 engages the camming surfaces 24 of the oscillatable cutters when the ejector pin 25 is shifted forwardly or toward the head 1, causing the cutters to be rocked or shifted on their pins 21 and 23 to the positions shown in Fig. 3 or to positions intermediate between those shown in Fig. 3 and the fully retracted positions of Fig. 1. This pin extends through the major portion of the length of the stem 2 and the stem is provided with opposite longitudinally extending slots 27 for the reception of the ends of a guide pin 28 which passes transversely through the ejector pin 25. This guide pin also extends at its ends into a sliding collar 29 which surrounds the stem 2 and interposed between this collar and the rear end of the head 1 is an expansion spring 30 which normally operates to retract the ejector pin 25.

The stem 2 has secured thereto an extension or shank 31 which has an enlarged circular inner end portion 32 which is located in spaced relation with the sliding collar 29. The shank 31 is provided for the connection of the drill in the chuck of a suitable driving connection by which the drill may be rotated.

Encircling the sliding collar 29 is a rotatable collar 33 which may be of any suitable form but which is here shown as consisting of an annular shell 34 in which the sliding collar 29 positions, and a cover plate 35 which is disposed within the shell and secured by the split locking ring 36. This rotatable collar 33 is encircled by a ring 37 which at diametrically opposite points is pivotally coupled with the collar 33 as indicated at 38. The ring at one side and in a plane perpendicular to the plane of the pivots 38, is provided with a pair of laterally extending spaced ears 39 between which is pivotally secured an end of a fulcrum link 40. The other end of this link 40 is attached to a rotatable collar 41 which encircles a shank 31 bearing against the inner side of the head 32 thereof and held in position by a fixed collar 42.

Opposite from the ears 39, the ring 37 has an interiorly threaded boss 43 in which is received a threaded end of a handle or lever 44 by means of which force may be applied to the sliding collar 29 for the compression of the spring 30 and the extension or ejection of the oscillatable cutters 15.

From the foregoing, it is believed that the operation of the present drill bit will be readily obvious. In the use of the bit, the shank 31 will be secured in a suitable chuck by which rotary motion can be imparted to the bit and when the bit is rotated at the proper speed, a bore of constant diameter may be cut into a body of material by the action of the blades of the fixed cutter 8. At any time during the cutting of such bore when the operator desires to start an inwardly directed taper, this may be accomplished by pressing the lever 44 so as to shift the ejector pin 25 forwardly and bring its rounded end 26 into the area between the recesses 18 of the oscillatable cutters and against the camming edges 24 thereof. This will rock the cutters 15 about the pins 21 and at the same time, because of the pins 23 engaging in the oblique slots 22, the forward or blade ends of the cutters will be projected forwardly and laterally. When projected to their extreme positions, the edges 17 of the oscillatable cutters will come into a common plane with the edges of the blades 13, thus cooperating with these blades for the cutting of the material at the inner end of the bore. Since the lateral edges of the oscillatable cutters are disposed at an angle to the lengths of the cutters as shown, it will be apparent that the projected points 19 of the oscillatable cutters will cut out the wall of the bore at the inner end so as to give to it the form indicated at 12 in Fig. 7. It will also be apparent that since the oscillatable cutters when fully projected will extend obliquely of the cutter head, the inner edges of these cutters which lie at the outer ends of the recessed portions 18, will also be obliquely extended and will form a V similar to the recess 10 cut in the center of the forward edge of the cutter 8 so as to cooperate with this part of the fixed cutter to form the cone 11 at the inner end of the bore.

When the bore has a cone formed at its inner end as illustrated, it will be readily seen that when a dowel is inserted into the bore and is provided in its end with a suitable recess to receive the cone 11 and is suitably longitudinally slit, the cone 11 will spread the end of the dowel into the widened inner end of the bore and thus lock the dowel securely therein.

It will be readily obvious that in place of a cutter of the specific form indicated by the numeral 8, there may be employed a cutter having a continuous cutting edge instead of two cutting edges divided by a recess, in which case the inner end of the bore would not have a cone or upstanding portion formed therein. Under these circumstances where the inner end of the bore is enlarged, a dowel might be spread and secured in the bore by the use of a metal or hardwood wedge fixed in the end of the dowel before it is inserted, such wedge being forced into the material of the dowel as the latter is driven home in the bore. It will also be readily apparent that by giving different shapes to the lateral or outer edges of the oscillatable cutters adjacent the points 19 thereof, the wall of the inner end of the bore may be given either a rounded convex or concave form.

Fig. 6 illustrates a fixed blade having a straight or continuous cutting edge, such blade being indicated generally by the numeral 45. This blade is provided at its transverse center with a centering tip or point 46 while at each end there is formed a side cutter 47 which operates as in all types of wood drills or bits, to cut the wood fibre so that the material may be readily chipped out by the blade of the cutter.

From the foregoing, it will be readily apparent that there has here been illustrated and described a new and novel form of drill bit for the cutting of inverted counterbore holes designed to receive dowels or formed for other purposes.

While there has been illustrated and described means for manually ejecting the pin 25, it will be understood that this operation may be accomplished by the mechanical setting of a compound lever actuated by a clutch whereby with the setting of this lever any degree of increase or pitch within the operating limits of the tool, may be obtained. It is also to be understood that while the present application is directed to the drill bit as a single unit, it may be readily employed in a gang for drilling or boring a number of holes of any of the shapes described.

The operation of drilling plasterboard for clinching the plaster and still not boring the hole entirely through the board is one of the typical examples of the numerous uses to which this drill may be put. The drill is also of value where it is desired to form a counterbore where one side of the material is inaccessible.

What is claimed is:

1. A drill bit of the character described, comprising a head body having a tubular stem, a cutter extending diametrically across the head and fixed thereto, a pair of cutters independently oscillatably supported in the head in a plane perpendicular to the first cutter for movement longitudinally of the head with simultaneous lateral movement, a pin slidable in said stem and having an end extending into the head, means for shifting said pin toward the head, said cutter having facing edge camming recesses, and a head upon the end of the pin within the head body which is movable into camming contact with said recess edges to effect oscillation and ejection of said cutters from a retracted position to a working position for cooperation with the first cutter.

2. A drill bit of the character described, comprising an elongated head having a central passage therethrough and a tubular stem integral with and extending from one end thereof in alinement with said passage, said head having two perpendicularly related slots formed therethrough and opening through the end remote from the stem, a fixed cutter disposed in one slot and having a cutting edge extending beyond the adjacent end of the head, a pair of cutters each oscillatably mounted in an end of the other slot and each having a cutting edge having the major portion thereof lying inwardly of the adjacent end of the head and having inwardly extending tail pieces, the said pair of cutters lying in a common plane and having opposing spaced camming edges, an ejector pin slidably disposed in said stem and having a headed end movable in one direction between said pair of cutters for contact with said camming edges to project the cutters beyond the said end of the first head and the sides thereof, means for actuating the ejector pin, and said tail pieces swinging into a position behind said headed end on projection of the cutters and forming means for engagement by the headed end when the latter is moved in the reverse direction to effect retraction of the cutters, each of said cutters having a lateral edge form designed to impart the particular form to the wall of a bore when the oscillatable cutters are projected.

3. A drill bit of the character described, comprising an elongated head of circular cross section having a working end and a rear end, the rear end of the head having a tubular stem extending therefrom and communicating with a passage leading longitudinally through the head, said head having a slot in the working end and extending diametrically thereacross, a fixed cutter lying in said slot and having cutting edges projecting beyond said working end, the head having a second diametrical slot in the working end extending perpendicular to the first slot, an oscillatable cutter in each end of the second slot, said oscillatable cutters having spaced opposed inner edges each formed substantially midway of its ends with a curved camming face, each of said oscillatable blades having an oblique cutting edge lying inwardly of the said working end of the head when the oscillatable cutter is not ejected, each of said oscillatable cutters having an outer cutting edge of a prescribed form for cutting a bore wall into a desired shape, an ejector pin slidable in said stem and having a working end insertible between said oscillatable cutters for contact with said camming edges, and means for effecting the shifting of said ejector pin into contact with said camming edges.

4. A drill bit of the character described, comprising an elongated head of circular cross section having a working end and a rear end, the rear end of the head having a tubular stem extending therefrom and communicating with a passage leading longitudinally through the head, said head having a slot in the working end and extending diametrically thereacross, a fixed cutter lying in said slot and having cutting edges projecting beyond said working end, the head having a second diametrical slot in the working end extending perpendicular to the first slot, an oscillatable cutter in each end of the second slot, said oscillatable cutters having spaced opposed inner edges each formed substantially midway of its ends with a curved camming face, each of said oscillatable blades having an oblique cutting edge lying inwardly of the said working end of the head when the oscillatable cutter is not ejected, each of said oscillatable cutters having an outer cutting edge of a prescribed form for cutting a bore wall into a desired shape an ejector pin slidable in said stem and having a working end insertible between said oscillatable cutters for contact with said camming edges, and means for effecting the shifting of said ejector pin into contact with said camming edges, said head having longitudinally extending channels formed therein between the cutter slots.

5. A drill bit of the character described, comprising a head having a working end and having a passage longitudinally therethrough, a tubular stem connected with the head and alined with the passage, a fixed cutter carried by the head for forming a circular bore, said head having a slot formed diametrically across said working end, an elongated flat cutter disposed in each end of the slot and extending longitudinally of the head, each of said cutters having an obliquely formed cutting edge and having an outer cutting edge joining the oblique cutting edge, said outer and oblique cutting edges being disposed within the head when the cutter is extending longitudinally thereof, each of said cutters having a longitudinally extending slot adjacent its inner end and an obliquely extending slot adjacent the cutting edge thereof, supporting pins carried by the head and passing through the slots of the cutters, an ejector member slidable in the passage of the head and in said stem, means for shifting said ejector pin toward the head, and camming means forming a part of each of the slotted cutters for engagement by said ejector pin to effect the oscillation of the cutters outwardly beyond the faces of the head.

6. A drill bit of the character described, comprising a head having a working end and having a passage longitudinally therethrough, a tubular stem connected with the head and alined with the passage, a fixed cutter carried by the head for forming a circular bore, said head having a slot formed diametrically across said working end, an elongated flat cutter disposed in each end of the slot and extending longitudinally of the head, each of said cutters having an obliquely formed cutting edge and having an outer cutting edge joining the oblique cutting edge, said outer and oblique cutting edges being disposed within the head when the cutter is extending longitudinally thereof, each of said cutters having a longitudinally extending slot adjacent its inner end and an obliquely extending slot adjacent the cutting edge thereof, supporting pins carried by the head and passing through the slots of the cutters, an ejector member slidable in the passage of the head and in said stem, means for shifting said ejector pin toward the head, and camming means forming a part of each of the slotted cutters for engagement by said ejector pin to effect the oscillation of the cutters outwardly beyond the faces of the head, said fixed cutter and said slotted cutters being so constructed and arranged as to form a centrally disposed cone in the base of the bore.

7. A drill bit of the character described, comprising a head having a working end and having a passage longitudinally therethrough, a tubular stem connected with the head and alined with the passage, a fixed cutter carried by the head for forming a circular bore, said head having a slot formed diametrically across said working end, an elongated flat cutter disposed in each end of the slot and extending longitudinally of the head, each of said cutters having an obliquely formed cutting edge and having an outer cutting edge joining the oblique cutting edge, said outer and oblique cutting edges being disposed within the head when the cutter is extending longitudinally thereof, each of said cutters having a longitudinally extending slot adjacent its inner end and an obliquely extending slot adjacent the cutting edge thereof, supporting pins carried by the head and passing through the slots of the cutters, an ejector member slidable in the passage of the head and in said stem, means for shifting said ejector pin toward the head, and camming means forming a part of each of the slotted cutters for engagement by said ejector pin to effect the oscillation of the cutters outwardly beyond the faces of the head, the said slotted cutters being given forward and lateral movement of said ejector pin and when fully ejected having the said oblique cutting edges thereof disposed in a common cutting plane.

8. A drill bit of the character described, comprising an elongated head of circular cross section, said head having a central bore and a tubular stem extending from one end and communicating with the bore, the other end of the head constituting the working end, a fixed cutting means extending transversely of said working end for the formation of a bore having a slightly larger diameter than the head, a slot formed diametrically across the working end of said head and extending longitudinally through a portion of the length of the head, an oscillatable cutter in each end of said slot, each of said cutters comprising an elongated flat body having an obliquely extending cutting edge extensible through the working end of the head and a lateral cutting edge connecting with the oblique edge and normally lying within the circumference of the head, each of said cutters having an obliquely extending slot adjacent the cutting edges and a longitudinally extending slot adjacent its inner end, guide pins carried by the head and passing through said slots, said pins being in the forward ends of the slots when the cutters are disposed longitudinally of the head or in retracted position, said cutters having their opposing edges recessed and each recess terminating in a camming face, an ejector pin slidable in the stem and into said recesses for contact with the camming faces for the ejection of the cutting edges of the cutters from said slot, and means for actuating said ejector pin comprising a sliding collar on the stem, a pin coupling the sliding collar with said ejector pin through a slot formed longitudinally of the stem, lever means connected with the stem and with said collar for effecting sliding movement of the latter, and spring means between the collar and the head for normally shifting the collar for the retraction of the ejector pin.

9. A drill bit, comprising a head body having a tubular stem, a pair of radial blades carried by the head and having cutting edges extending perpendicularly to the axis of the stem, a second pair of blades carried by the head and lying in a plane perpendicular to the first blades and having cutting edges disposed oblique to said axis along lines converging behind the cutting plane of the edges of the first blades, said second pair of blades being shiftable outwardly and laterally, means in said tubular stem for effecting the shifting of the second pair of blades, and said second pair of blades when shifted outwardly to the limit of their movement having their cutting edges parallel and lying in the cutting plane of the first blades and having the remote ends of their cutting edges disposed farther from the axial center of the head than the remote ends of the cutting edges of the first blades.

10. A drill bit, comprising a head body having a tubular stem and a working end provided with two crossed slots, a pair of cutting blades alined in one slot and having cutting edges spaced at their inner ends and extending perpendicularly to the turning axis of the head, a second pair of cutting blades in the other slot and each having a cutting edge extending substantially obliquely of said axis, each of the blades of the second pair being movable toward said working end and laterally, the cutting edges of the movable blades having a major portion thereof lying inwardly of the cutting plane of the edges of the first blades and having their outer ends substantially in such plane, and means movable in said stem for engaging and moving said movable blades into a position where the cutting edges thereof are parallel and lie in the cutting plane of the edges of the first blades and the remote ends of such edges are spaced apart a greater distance than the remote ends of the edges of the first pair of blades and the adjacent edges of the movable blades are disposed in divergent relation toward the working end of the head.

CHARLES B. GERARDI.